United States Patent [19]
Beavers et al.

[11] Patent Number: 5,842,179
[45] Date of Patent: Nov. 24, 1998

[54] METHOD AND APPARATUS FOR INVENTORYING LABORATORY SPECIMENS

[75] Inventors: Steven P. Beavers, Zeeland, Mich.; Brian L. Nahey, Hartland, Wis.; Richard M. Telgenhoff, Holland, Mich.

[73] Assignee: Venturedyne Limited, Milwaukee, Wis.

[21] Appl. No.: 589,391

[22] Filed: Jan. 22, 1996

[51] Int. Cl.[6] .................................................. G06F 17/60
[52] U.S. Cl. ............................................. 705/28; 235/385
[58] Field of Search ..................... 198/346.1; 206/443; 62/63, 440, 51.1; 235/385; 705/28

[56] References Cited

U.S. PATENT DOCUMENTS

| | | | |
|---|---|---|---|
| 4,164,320 | 8/1979 | Irazoqui et al. | 235/375 |
| 4,476,381 | 10/1984 | Rubin | 235/375 |
| 4,678,894 | 7/1987 | Shafer | 235/375 |
| 4,783,740 | 11/1988 | Ishizawa et al. | 705/28 |
| 4,855,909 | 8/1989 | Vincent et al. | 364/413.01 |
| 4,857,713 | 8/1989 | Brown | 705/3 |
| 4,870,829 | 10/1989 | Oullette et al. | 62/51.1 |
| 4,898,278 | 2/1990 | Leoncavallo et al. | 206/443 |
| 4,920,488 | 4/1990 | Filley | 705/28 |
| 4,969,336 | 11/1990 | Knippscheer et al. | 62/266 |
| 5,009,316 | 4/1991 | Klein | 206/443 |
| 5,025,140 | 6/1991 | Varley | 235/385 |
| 5,125,240 | 6/1992 | Knippscheer et al. | 62/266 |
| 5,164,575 | 11/1992 | Neeley | 235/472 |
| 5,166,499 | 11/1992 | Holland | 235/376 |
| 5,171,977 | 12/1992 | Morrison et al. | 235/375 |
| 5,176,202 | 1/1993 | Richard | 165/48.1 |
| 5,205,128 | 4/1993 | Richard | 62/63 |
| 5,233,844 | 8/1993 | Knippscheer et al. | 62/440 |

*Primary Examiner*—Gail O. Hayes
*Assistant Examiner*—Raquel Alvarez
*Attorney, Agent, or Firm*—Jansson, Shupe, Bridge & Munger, Ltd.

[57] ABSTRACT

The new method is particularly useful for inventorying frozen laboratory specimens such as found in a hospital or research center. The method includes placing a specimen at a primary location in a freezer, selecting an "identifier" unique to that specimen and displaying a symbol representing the primary location. More typically, both the storage system and the number of specimens are quite large and progressively-more-specific secondary, tertiary and even sub-tertiary locations will also be displayed. Removing the specimen from the compartment involves manipulating the freezer interface device, e.g., keypad and screen, to display at least the primary location. The user may manipulate by "scrolling" the screen or by entering certain specimen-identifying parameters such as a specimen description, the date of initial storage and others. An optional security arrangement can be incorporated and requires that persons attempting to place or remove a specimen must enter a personal identification number (PIN). A related apparatus is also disclosed.

18 Claims, 9 Drawing Sheets

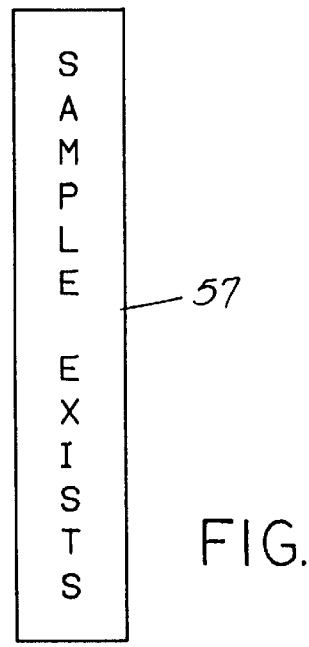
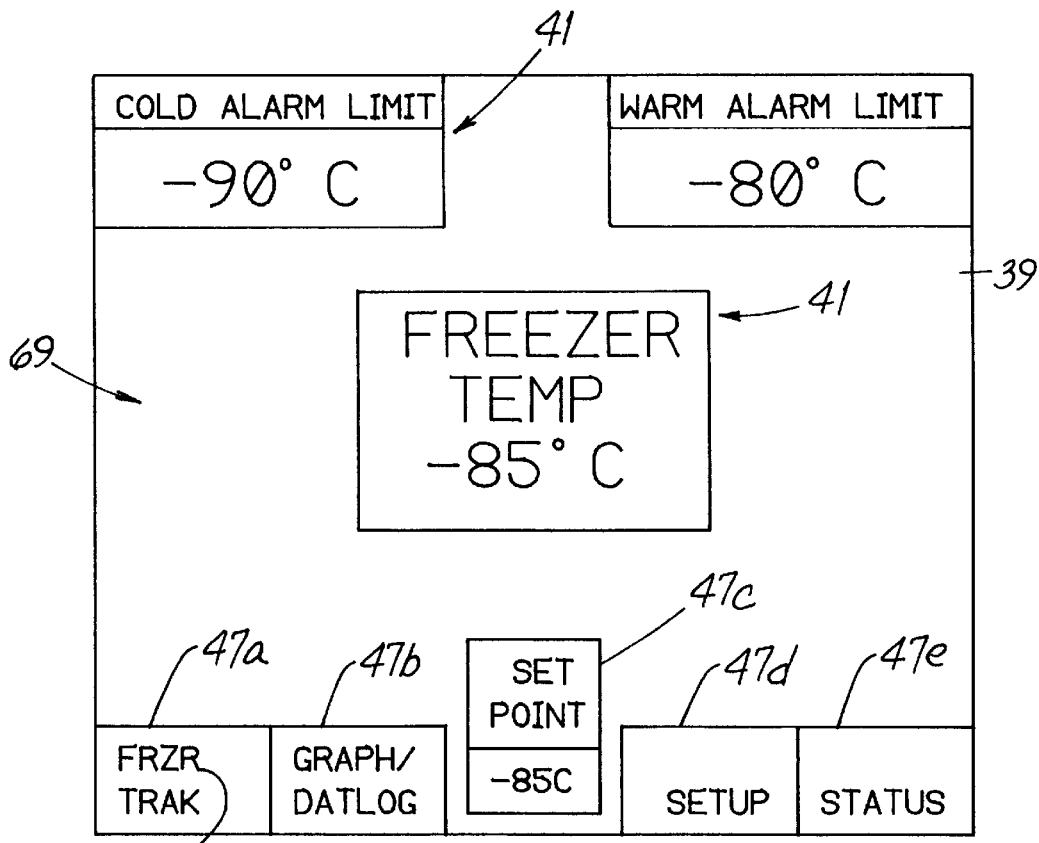

SAMPLE ID: AG347

DESCRIPTION: TEST VIAL    DOOR :01
DATE :07/25/95           RACK :03
USER ID :SPB             BOX :01
STATUS :STORED           POSITION :050

41    71                              39

REMOVE SAMPLE    DELETE SAMPLE    SAVE SAMPLE

FIG. 13

SAMPLE ID: AG347

DESCRIPTION: [ ]    DOOR :
DATE :              RACK :
USER ID :           BOX :
                    POSITION :

39              41

SAVE SAMPLE

FIG. 16

| SAMPLE ID | | | |
|---|---|---|---|
| DESCRIPTION | | DOOR | |
| DATE | | RACK | |
| USER ID | | BOX | |
| STATUS | | POSITION | |

ENTER PIN #   SAVE

| SAMPLE ID | | | |
|---|---|---|---|
| DESCRIPTION | | DOOR | |
| DATE | | RACK | |
| USER ID | | BOX | |
| | | POSITION | |

FIND SAMPLE

39

METHOD AND APPARATUS FOR INVENTORYING LABORATORY SPECIMENS

FIELD OF THE INVENTION

This invention relates generally to electrical computers and data processing systems and, more particularly, to such systems as used for management of a large "inventory" of laboratory specimens.

BACKGROUND OF THE INVENTION

In the course of treating patients or conducting research, facilities such as hospitals and medical research centers routinely take samples of blood, cells, tissue and the like. Such samples are confined in small vials for storage and are often referred to as "specimens." And since such specimens deteriorate rapidly at ambient temperature, they are stored in cryogenic freezers which maintain them at very low temperature, e.g., −80° C. or about −175° F.

And the number of specimens may be quite large. Having several hundred thousand or even a million or more specimens in freezer storage at one time is not all that unusual. Quite aside from the freezer equipment needed to do so, retaining an inventory (especially a large inventory) of specimens presents some unusual record-keeping problems.

It is important that the specimens be kept in a orderly manner, initially by storing a specimen at a location specifically identified only to that single specimen. When a specimen is later removed from cold storage for analysis or discard, the inventorying system should preferably be configured to help assure that only the specific desired specimen is removed. While high accuracy in the matter of storage placement and removal is important, there are other important aspects of specimen storage, as well.

For example, the time required to search for and locate either a storage location for a new specimen or an existing location for a stored specimen needs to be minimized. This is so since visual searching inside the freezer requires that the freezer door be open. When such door is open, the temperature of specimens inside the freezer starts to undesirably rise.

And when ambient air migrates into the freezer, frost can (and usually does) form and energy is wasted. It takes little imagination to understand that defrosting a large laboratory freezer and finding temporary storage for frozen specimens is a complex and time-consuming task.

Known prior art arrangements do not lend themselves to tracking a large number of laboratory specimens and do not satisfactorily facilitate quick, accurate manual placement and removal of such specimens and creation of a specimen record. U.S. Pat. Nos. 4,969,336 (Knippscheer et al.); 5,125,240 (Knippscheer et al.) and 5,176,202 (Richard) involve cryogenic storage of biological specimens.

The apparatus of the Knippscheer et al. patents use an automatic storage and retrieval mechanism. Insertion and withdrawal of a single ampule is accomplished by such mechanism without exposing other ampules to ambient air. The apparatus of the Richard patent uses a servomechanism for retrieving a selected ampule. Code numbers are preassigned to ampule positions within the apparatus which has a single access door. The apparatus of the Knippscheer et al. '240 patent is said to be suitable for about 8000 ampules, a modest number for a large research facility. And to use such apparatus, it is presumed that the user already has a record of a code which identifies the precise location of a particular ampule.

U.S. Pat. No. 4,898,278 (Leoncavallo, et al.) describes a multi-compartment container for holding up to eighty-one separate laboratory vials. Using the container contemplates having a written inventory list setting out the position of each vial and a description of the vial contents.

OBJECTS OF THE INVENTION

It is an object of the invention to provide an improved method for inventorying laboratory specimens which overcomes some of the problems and shortcomings of the prior art.

Another object of the invention is to provide an improved method for inventorying laboratory specimens which accommodates a very large number of specimens.

Another object of the invention is to provide an improved method for inventorying laboratory specimens which facilitates manual placement and removal of specimens.

Another object of the invention is to provide an improved method for inventorying laboratory specimens which is suitable for use with a cryogenic laboratory freezer.

Yet another object of the invention is to provide an improved method for inventorying laboratory specimens which minimizes accumulation of frost in such a freezer.

Another object of the invention is to provide an improved method for inventorying laboratory specimens which is adapted for use with several freezers at a particular facility.

Still another object of the invention is to provide an improved method for inventorying laboratory specimens which minimizes the time required to manually locate a storage location for a new specimen and an existing location for a stored specimen.

Another object of the invention is to provide an improved method for inventorying laboratory specimens which creates a record of specimen locations.

Yet another object of the invention is to provide an improved method for inventorying laboratory specimens which permits searching for a specimen record using certain (but not all) identifying parameters. How these and other objects are accomplished will become apparent from the following descriptions and from the drawings.

SUMMARY OF THE INVENTION

The new method is particularly useful in applications involving storing and managing an "inventory" of specimens which may include hundreds of thousands or even more than a million such specimens. Each specimen includes a lab vial and a small amount of blood, tissue, cells or the like within such vial. The method includes placing a specimen at a primary location in a freezer compartment, selecting a specimen identifier and displaying a symbol representing the primary location.

As the number of specimens to be inventoried increases, so will the volumetric capacity of the storage facility. In that event, it is helpful (to avoid spending inordinate time searching for a particular specimen) to place the specimen at a secondary location, at a tertiary location and perhaps even a sub-tertiary location within the primary location. Each location is progressively more specific in that a progressively smaller number of vials will be stored in each location as such locations are considered in the hierarchical order mentioned above.

In a more specific aspect of the method, that identifier which is selected by the person dealing in some way with a specific specimen is a "preliminary" specimen identifier.

This is so since there is the possibility that such preliminary identifier may have been incorrectly selected and may already be in use. The selecting step includes providing a warning, e.g., a visual signal appearing on a screen, that the preliminary identifier is already in use. In that event, another specimen identifier needs to be selected.

Other aspects of the new method relate to removing the specimen from the compartment. A preferred storage compartment includes an interface device such as one or more keypads and one or more screens. Removing the specimen includes manipulating the interface device to display the primary location on a screen. There are several exemplary ways in which this can be done. The most straightforward way is to enter the specimen identifier and thereby display a specimen location or its hierarchy of locations.

Another way, more useful when the specimen to be removed was only recently stored or when there is a small number of specimens in storage (and if the specimen identifier is not readily available), involves manipulating the device to "scroll" the screen until the proper specimen identifier is displayed. Still another way is more useful when a large number of specimens is involved and/or when there have been a number of other specimens stored and/or removed since placement of that specimen which is now to be removed. Such way involves entering a specimen identifying parameter selected from a group of parameters which includes (a) the specimen identifier, (b) a specimen description, (c) a date, a personal identification number (PIN) or the like. The specimen record data base is then searched and individual specimen records are then displayed in sequence until the proper specimen identifier and the specimen location information are found.

The new method also has features to "track" the status of a specimen and record whether such specimen is in storage or has been removed from storage. Using such feature, the manipulating step includes manipulating the interface device to display the status of the specimen and the removing step includes changing the displayed status as, for example from STORED to REMOVED.

In other aspects, the new method has a security feature which prevents unauthorized persons from gaining access to the data base. The step of placing the specimen in a freezer compartment is preceded by the step of entering a personal identification number.

Yet another aspect of the invention involves removing a freezer-stored laboratory specimen where (as is highly desirable) such specimen is identified by a unique identifier. The method includes providing an interface device, e.g., a keypad and interactive display screen, coupled to the freezer. Such device is manipulated to enter the unique specimen identifier and a hierarchy of specimen locations is thereby displayed, either simultaneously or in sequence. A particular one of the locations making up the hierarchy is unique to the specimen. The specimen is thereupon removed from the particular location. For security purposes, the manipulating step may be preceded by the step of entering a personal identification number.

In another aspect of the invention, an apparatus for inventorying laboratory specimens includes a screen displaying information relating to the location of a laboratory specimen in a freezer. The apparatus also has a plurality of hard keys for changing the information displayed on the screen and a plurality of soft keys. Each soft key is identified by a mnemonic legend displayed on the screen.

More specifically, the information displayed on the screen includes a specimen identifier, a specimen description and a date. Most preferably for ease of use, the apparatus is mounted on a cryogenic freezer containing the specimens to which the displayed information relates.

Other aspects of the invention are set forth in the following detailed description and in the drawings.

BRIEF DESCRIPTION OF THE DRAWINGS

FIGS. 8 through 17 are specific informational depictions that may be displayed on the screen of the apparatus of FIG. 1.

DETAILED DESCRIPTION OF PREFERRED EMBODIMENTS

Figure 1:
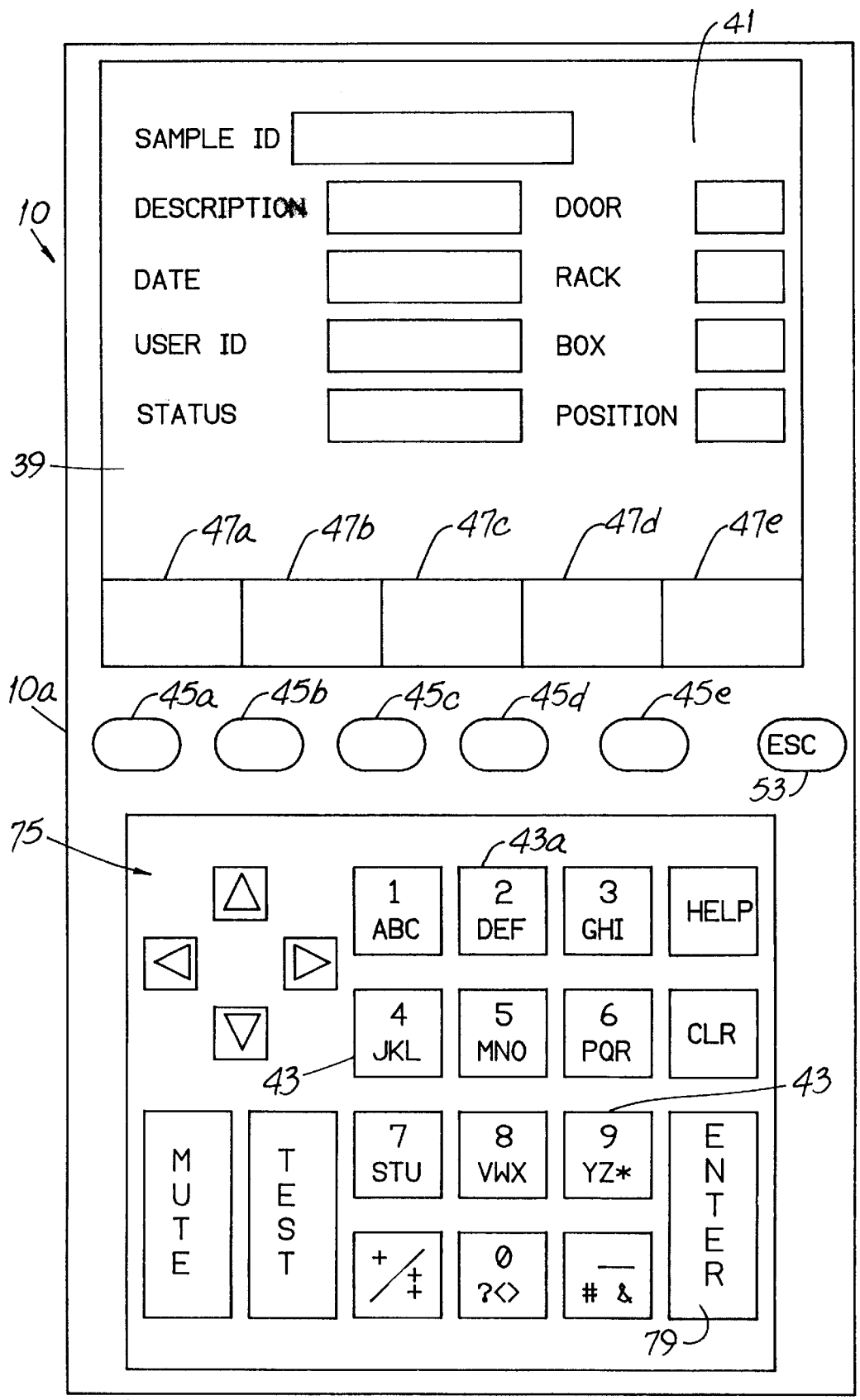
FIG. 1 is a front elevation view of the inventive apparatus.

Before describing the new method, it will be helpful to have an understanding of an exemplary embodiment of the apparatus 10 which may be used to carry out such method. It will also be helpful to have an understanding of an exemplary cryogenic freezer and how a hierarchy of specimen locations may be organized. Understanding will also be aided by first referring to definitions near the end of this specification. The freezer and its hierarchy of locations is described first. Such description is followed by a description of the apparatus 10 and then by a description of the new method.

Hierarchical Organization of Freezer(s)

Referring to FIGS. 1–5, the apparatus 10 is preferably mounted on a cryogenic freezer 11 of the type used to store laboratory specimens. An exemplary freezer 11 has a main door 13 which, when open, exposes all of the compartment doors 15 (five doors 15 in the example) behind such main door 13.

In turn, each compartment door 15 closes a specimen storage compartment 17 associated with that door 15 and containing a plurality of individually-movable racks 19 for holding specimens. The specific embodiment has four racks 19 behind each door 15. For quick, easy access, each rack 19 is of the pullout type riding on rollers like those used with a common kitchen drawer.

Figure 5:
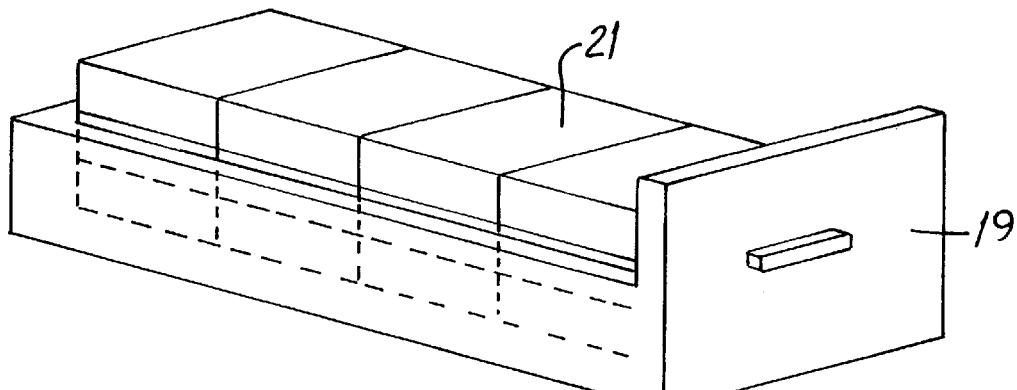
FIG. 5 is a perspective view of one of the racks of FIG. 4 shown with specimen storage boxes therein. Surfaces of boxes are shown in dashed outline.
Figure 6:
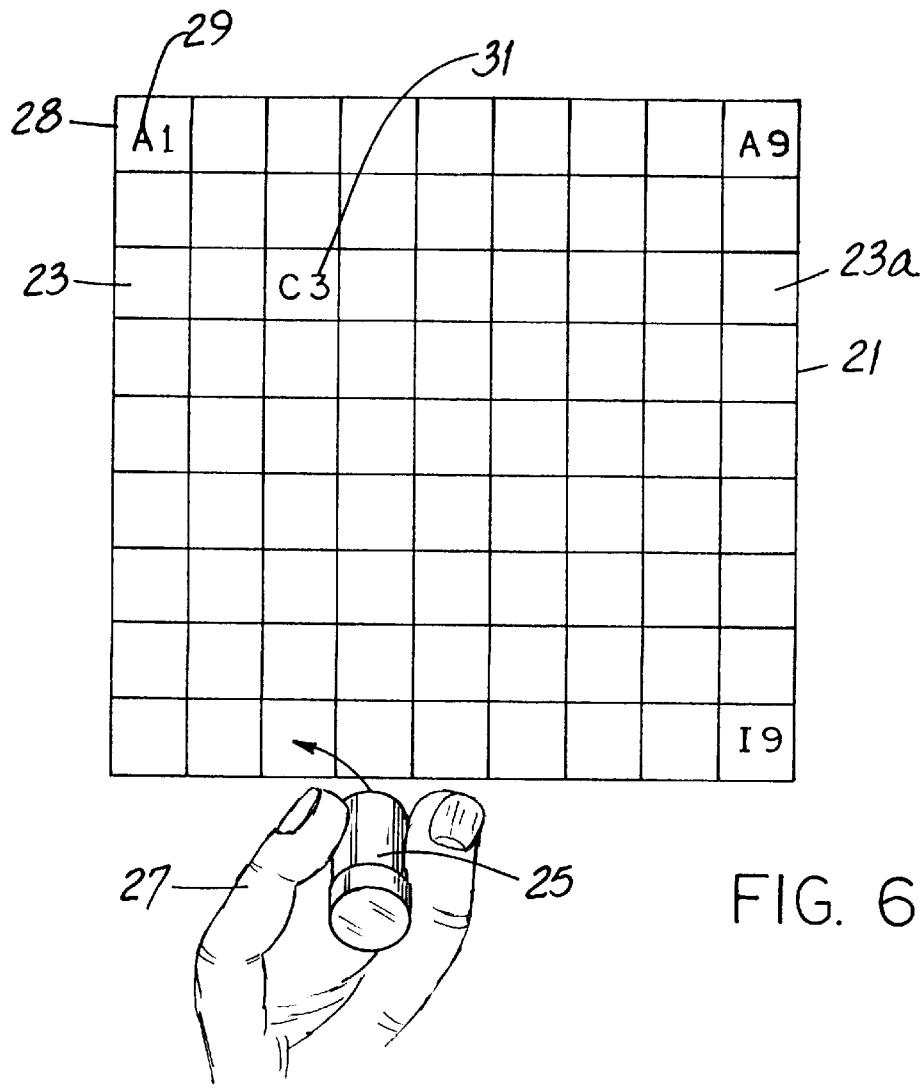
FIG. 6 is a top plan view of one of the boxes of FIG. 5 shown in conjunction with a laboratory specimen being placed at a position within such box.

As shown in FIGS. 5 and 6, each rack 19 supports a plurality of boxes 21, each box 21 being divided into a plurality of volumetric locations 23 or positions 23a. Each location 23 and position 23a is sized to hold a specimen 25 and to permit such specimen 25 to be quickly, manually withdrawn therefrom using one's fingers 27. In the example of FIGS. 5 and 6, there are twelve boxes 21 on a rack 19 (arranged three boxes high and four boxes front-to-rear) and eighty-one locations 23 in each box 21. As shown in the exemplary box 21 of FIG. 6, each location 23 is identified by row 28 (denoted by a letter 29) and by the unique location (denoted by a number 31) within such row 28. Or such locations 23 may be identified by numbers, letters or symbols, each of which is unique for that box 21.

In instances involving a single exemplary freezer 11, a primary specimen location is a particular freezer compartment door 15, a secondary location is a particular rack 19 behind such door 15 and a tertiary location is a box 21 on such rack 19. And a sub-tertiary (or "second-tertiary") location is a particular position 23a in such box 21 and in which is stored a single specimen 25.

Figure 2:
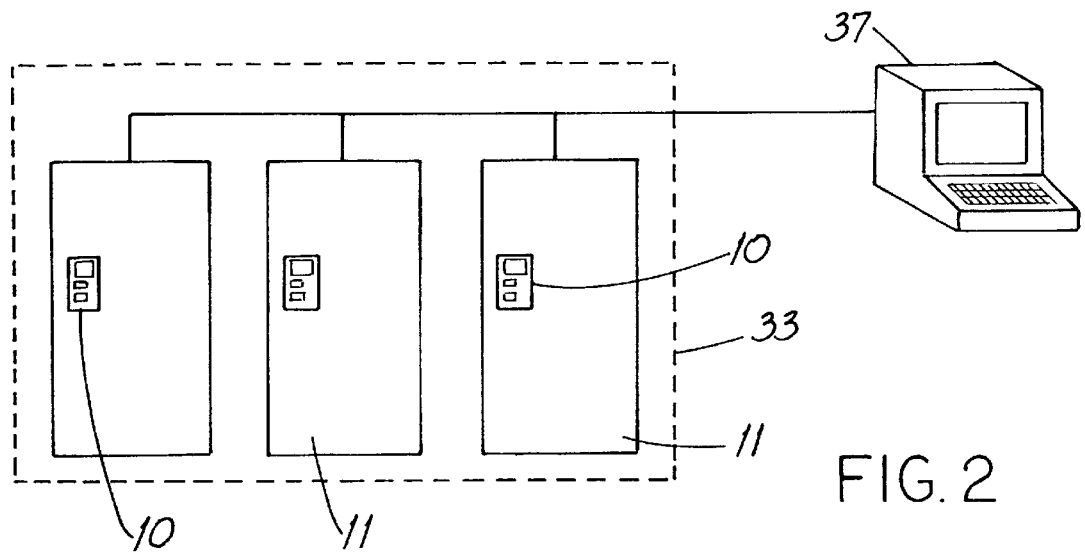
FIG. 2 is a representative view of plural cryogenic freezers in a room and networked to a common host computer.

In instances involving plural freezers 11 in a single room 33 as represented by FIG. 2, a primary specimen location is a particular freezer 11, a secondary location is a particular freezer door 15 of the freezer which constitutes the primary location. A tertiary location is a rack 19 behind such door 15, a second-tertiary location is a box 21 on such rack 19 and a third-tertiary location is a specific position 23a in such box 21. (When referring to a position 23a in a box 21 or other container and where the position 23a is capable of holding only a single specimen 25, the terms "position" and "location" are used interchangeably.)

Figure 7:
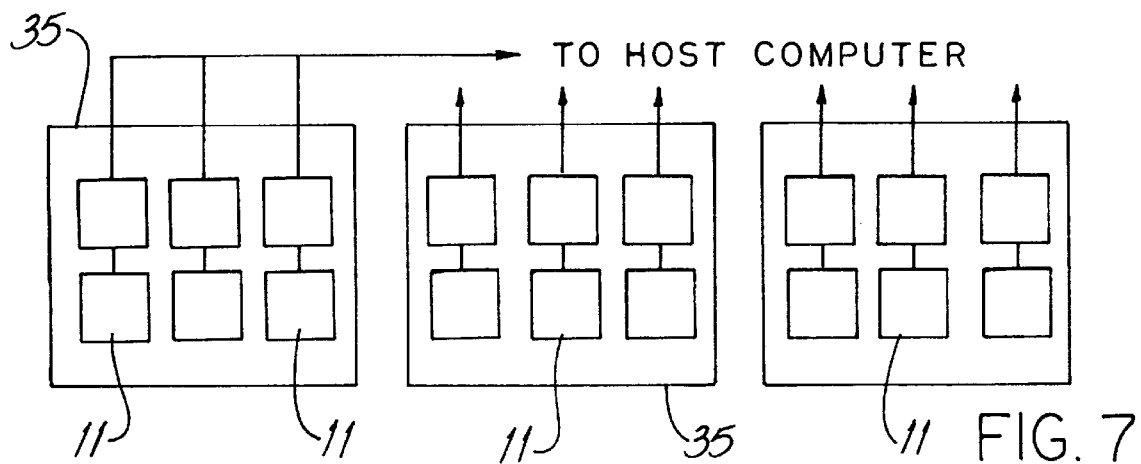
FIG. 7 is a representative view of plural cryogenic freezers located within several rooms or buildings and networked to a common host computer.
Figure 4:
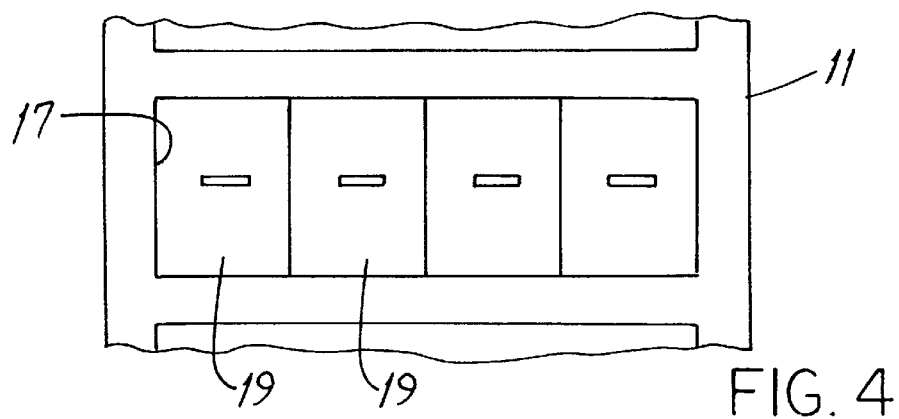
FIG. 4 is a front elevation view of storage racks behind one of the compartment doors of the freezer of FIG. 3. Parts are broken away.
Figure 3:
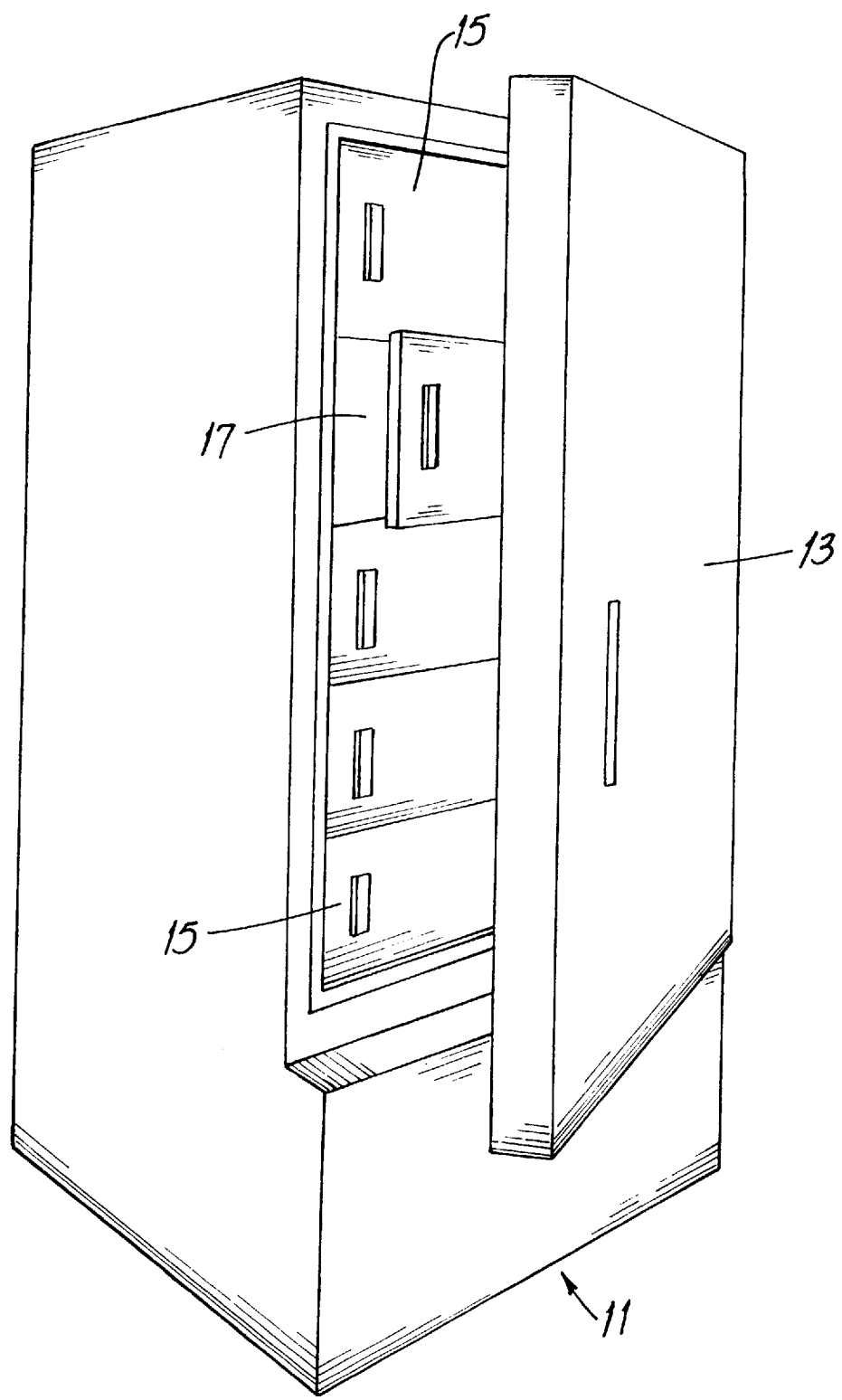
FIG. 3 is a perspective view of one of the freezers of FIG. 2.

In facilities like that of FIG. 7 involving several rooms 33 or buildings 35, each having plural freezers 11 (not an uncommon circumstance for a large research center), a primary specimen location is a particular room 33 or building 35, a secondary location is a particular freezer 11 within such room 33 or building 35 and a tertiary location is a particular freezer door 15 of the freezer 11 which constitutes the secondary location. A second-tertiary location is a rack 19 behind such door 15, a third-tertiary location is a box 21 on such rack 19 and a fourth-tertiary location is a specific position 23a in such box 21. And freezers 11 may be operated in "standalone" fashion or networked together to a host computer 37.

The Apparatus

Figures 8, 17:
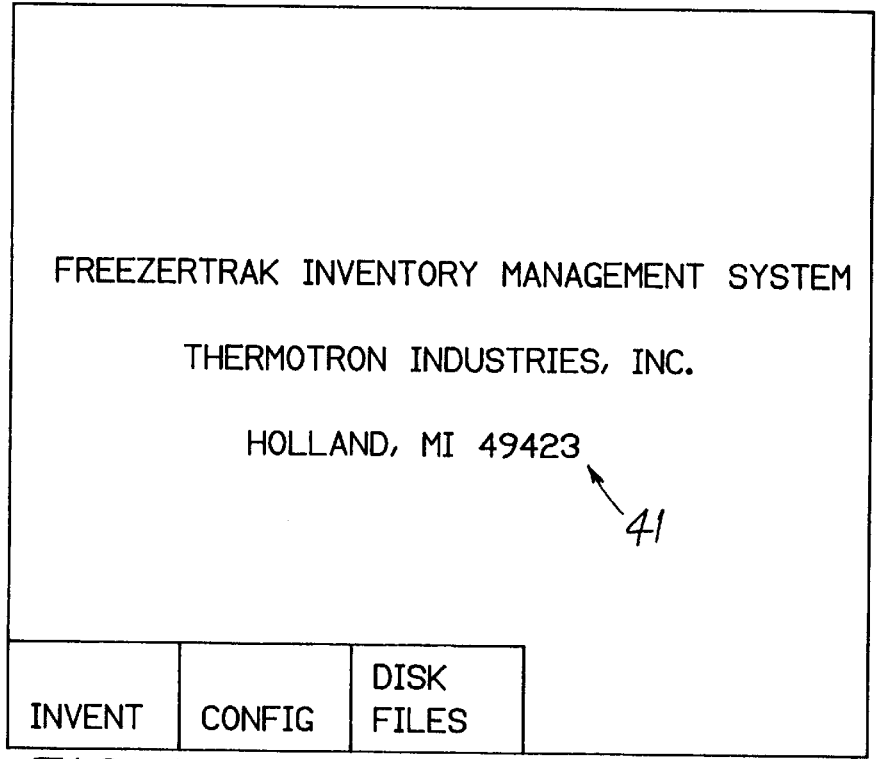

Referring to FIGS. 1, 2 and 8, the apparatus 10 functions as an interface device 10a with respect to a freezer 11 and has a screen 39 for displaying information 41 relating to the location 23 of a particular specimen 25 in such freezer 11. There is a plurality of hard keys 43 and a plurality of soft keys 45 for changing the information 41 displayed on the screen 39. Each soft key 45 is identified by a mnemonic legend displayed on the screen at a site 47 and at least some of such keys 45 are used to "scroll" the screen 39 to display any of several available images as further described below.

The following describes by way of a simple example how soft keys 45 and legends are used. More detailed steps are described below in the "Method" section of the specification.

It is assumed that the information shown in FIG. 9 is displayed on the screen 39. There are box-like sites 47a–47e (five in the example) that correspond in number and position to the number and positions of the soft keys 45a–45e, respectively. Depressing the soft key 45a corresponding to the site 47a marked with the mnemonic legend 49 (FRZR TRAK, an abbreviation of the proposed trademark FREEZER TRAK), causes the screen 39 to "scroll" and the information 41 of FIG. 8 to be displayed thereon.

Figures 10, 11:
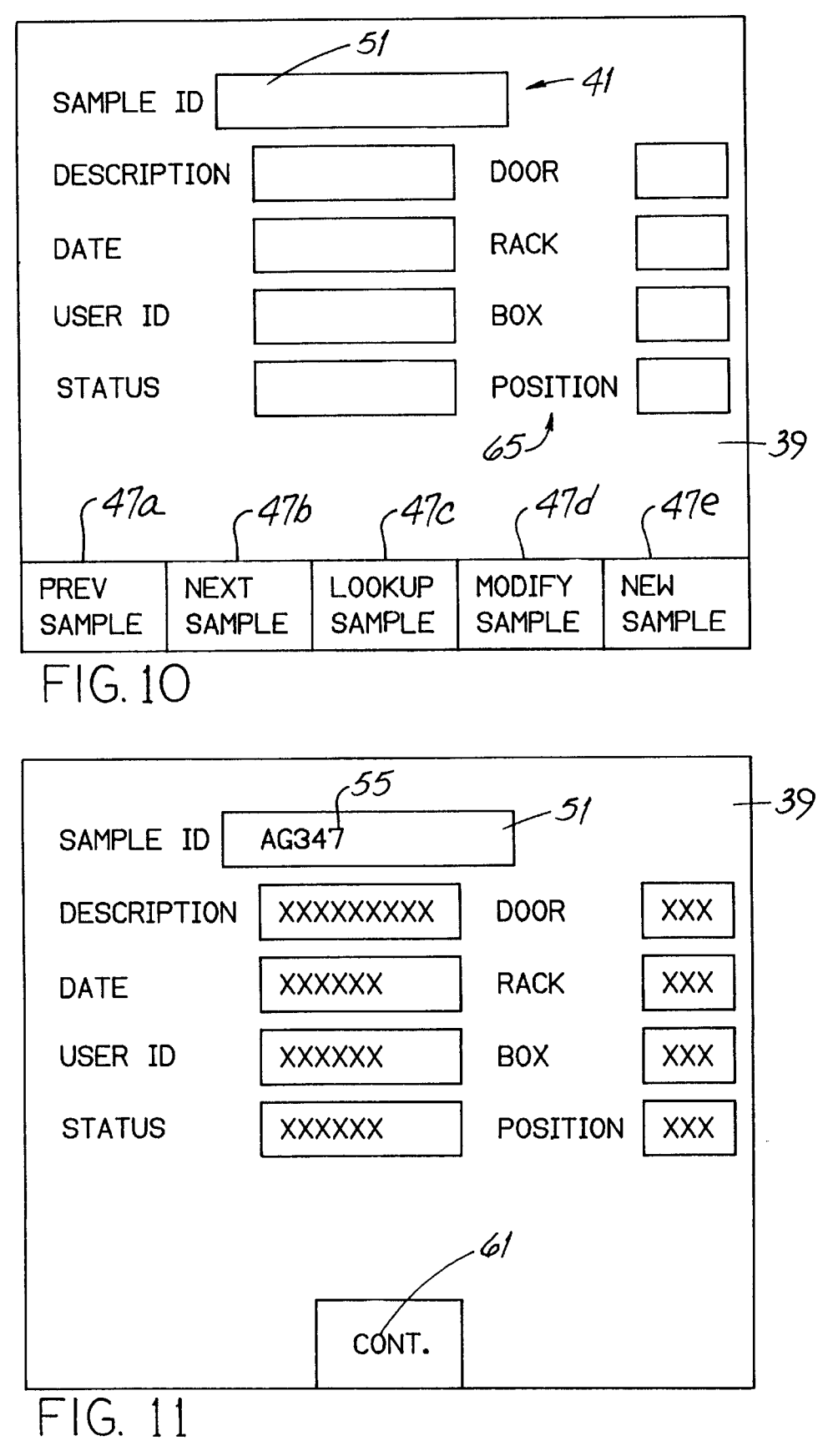

As a next step, depressing the soft key 45a corresponding to the site 47a marked with the mnemonic legend INVENT (an abbreviation of "inventory"), causes the screen 39 to "scroll" and the information of FIG. 10 to be displayed thereon. (It is to be noted that in the foregoing sequential example, it is the same soft key 45a which is depressed to cause the information 41 of FIG. 8 to be displayed on the screen 39 and then to cause the information 41 of FIG. 10 to be displayed on such screen 39.)

In a highly preferred embodiment, the hard keys 43 are capable of providing letters and/or numbers to "build" a specimen identifier. If, for example, the hard key 43a is used first, the numeral 2 appears in the space 51 and the letters D, E and F appear in sequence at the sites 47a, 47b and 47c, respectively. If another hard key 43 is used next, the numeral 2 remains. But if a D, E or F soft key (key 45a, 45b or 45c) is pressed next, the 2 is replaced by the letter corresponding to that soft key 45 which is pressed.

The Method

Initially storing a specimen

This first descriptive part explains how to store a specimen 25 in a specific location 23 in a box 21 and how to manipulate hard and soft keys 43, 45 to create a record of such location 23 as well as the higher-ranked locations in a hierarchy of locations. Such record is desirable as an inventory management tool and to efficiently retrieve a specimen 25 at some later time.

After opening the main door 13 and a compartment door 15 of a compartment 17 having an available box location 23 unoccupied by a specimen 25, the specimen 25 is placed in any such available location 23 and such location 23 is noted as the doors 15 and 13 are closed. Using the apparatus 10, the "Escape" key 53 is repetitively depressed until the main menu of FIG. 9 is displayed on the screen 39. Thereupon, the soft key 45a corresponding to the legend 49 (FRZR TRAK) is depressed, causing the introductory information 41 of FIG. 8 to be displayed.

The soft key 45a corresponding to INVENT is then depressed to display the specimen inventory information 41 of FIG. 10 on the screen 39. Then the soft key 45e corresponding to NEW SAMPLE is depressed to display the information 41 of FIG. 11. A unique specimen identifier 55 is then created by using the hard keys 43 and soft keys 45, actuation of which will cause such identifier 55 to appear in the space 51. The specification identifier AG347 shown in FIG. 11 is merely an arbitrary example. (The XXX symbols in certain spaces in FIG. 11 means that such spaces cannot be "written into" while the information 41 of such FIG. 11 is being displayed.)

One should recognize that it is possible to have the identifier 55 itself constituted as a "readable" hierarchy of locations. For example, consituting identifier 55 as the "F3D3R2B4-79" could mean freezer #3, door #3 of such freezer 11, rack #2 behind such door 15, box #4 within such rack 19 and position #79 in such box 21.

But in a facility required to maintain records on a very large number of specimens 25 (and considering that computer data fields will accept only a rather modest number of characters), a more practical way is to use identifiers 55, the system of which is developed arbitrarily. In this instance, the identifier 55 becomes a specimen identifier by virtue of its being "linked" in the computer system to identifying parameters, e.g., specimen description, hierarchical location information and the like, for a particular specimen 25. (An analogous example is a license plate which is meaningless as an identifier of a motor vehicle until the plate designation and particulars about the vehicle are brought together in a more-or-less permanent record.)

One might consider the identifier 55 to be a "preliminary" specimen identifier 55 since there is the possibility that such preliminary identifier 55 may have been incorrectly selected and may already be in use. In the event the selected identifier 55 is already in use, the user of the apparatus 10 is so notified in the following manner. A warning is provided in the form of a visual signal like the image 57 of FIG. 12 which appears to overlay the information 41 shown in FIG. 11 by blocking out much of it.

After the specimen identifier 25 is created as described above, the soft key 45c corresponding to the mnemonic legend 61 (CONT.) is depressed, thereby causing the information of FIG. 13 to be displayed on the screen 39. The hard keys 43 or hard and soft keys 43, 45 are used to enter data including DATE, DESCRIPTION and USER ID in appropriate spaces. The hierarchy of locations, e.g., DOOR, RACK, BOX and POSITION, for that particular specimen 25 are also entered in appropriate spaces.

(The foregoing is based upon a particular configuration in which each freezer 11 has its own dedicated apparatus 10 mounted in the main door 13. Therefore, the primary location as to that apparatus 10 and that freezer 11 is a compartment door 15. In a configuration like one of those shown in FIG. 2 or 7, the primary location may be one of several freezers 11 or one of several rooms 33 or buildings 35.)

In a very specific method, the only information which is required to be filled in to create a valid specimen record is the SAMPLE ID and the DATE. After specimen-related data is entered, the soft key 45c corresponding to the mnemonic legend SAVE SAMPLE is depressed.

Locating an earlier-stored specimen

Having created a specimen record, it is a straightforward task (with the aid of the invention) to learn the specific position in, say, a box 21 in which a particular specimen 25 is kept. And after appreciating the method, it will be apparent that the amount of time the doors 13 and 15 will be open during specimen retrieval is very short.

To locate an earlier-stored specimen 25, the "Escape" key 53 is pressed until the information of FIG. 9 appears on the screen 39. Other keys 45 are pressed as described above until the information 41 of FIG. 10 is on the screen 39.

Once such information is displayed, there are two ways to find the desired sample record. One is to scroll the screen 39 (using soft keys 45a, 45b corresponding to the legends PREV. SAMPLE and/or NEXT SAMPLE until the desired specimen record is displayed.

Another way is to cause a computerized search for a record by entering identifying parameters 65 of the specimen 25 for which the search is being conducted. Such parameters 65 may include the identifier 55 itself, and/or the DATE (on which such specimen was first stored), DESCRIPTION, USER ID, DOOR, RACK, BOX or POSITION.

To enter one or more parameters 65, the user presses the soft key 45c corresponding to LOOKUP SAMPLE and information will appear as in FIG. 14 on the screen 39. After at least one of such parameters 65 is entered, the user presses the soft key 45c corresponding to the mnemonic legend FIND SAMPLE to display the first specimen record identified by the apparatus 10 which has parameters corresponding to those entered. The record will be displayed in the form shown in FIG. 10 and the sites 47b and 47a will be marked with the mnemonic legends FIND NEXT and FIND PREV rather than NEXT SAMPLE and PREV SAMPLE, respectively.

Repetitively pressing the sites 47a, 47b having the legend FIND NEXT and/or FIND PREV causes those records for each specimen 25 having the entered parameters 65 to appear in sequence on the screen 39 of FIG. 10. Of course, if the unique specimen identifier 55 is the only parameter entered or is among the parameters 65 entered, a single depression of the soft key 45c corresponding to the FIND SAMPLE site 47c is all that is required to display the record for that specimen 25.

Record checking

The apparatus 10 and method also permit one to analyze (and, if necessary, correct) the record relating to a particular specimen 25. To do so, a particular specimen of interest is selected by noting its unique position 23a and, optionally, by removing such specimen 25 from the freezer 11 in which it is stored. By manipulating keys as described above, the user causes the main menu 69 of FIG. 9 and then the information of FIG. 14 to be displayed. Thereafter, the keys 43, 45 are used to fill in one or more specimen parameters 65 as mentioned above and the soft key 45c corresponding to the site 47c and its legend FIND SAMPLE used to search.

(It will be appreciated that the steps used for record checking are closely similar to those described immediately above and used to identify an earlier-stored specimen 25. The record checking procedure may also be described as a "look-back" feature provided for record verification purposes.)

Status tracking

The new apparatus 10 and method may be used to "track" and record the temporary removal of a specimen 25 from a freezer 11. Using keying sequences described above, the information shown in FIG. 10 is displayed on the screen 39 and the soft key 45d corresponding to the site 47d and MODIFY SAMPLE is pressed. This causes information 41 to be displayed as in FIG. 15.

If the specimen 25 is in the freezer 11 (as indicated by the status information STORED at the space 71) and if such specimen 25 is being removed from the freezer 11, the soft key 45a corresponding to the site 47a and legend REMOVE SAMPLE is pressed. Thereupon, the status information changes from STORED to REMOVED while maintaining all other information in the record. The soft key 45e corresponding to the site 47e and legend SAVE SAMPLE is then pressed to save the record noting the specimen 25 as being removed from the freezer 11.

If the specimen 25 has been removed from the freezer 11 and is being returned in its original position 23a, the user presses keys 45 to cause information to be displayed as in FIG. 15 except that the status information will be (or should be) REMOVED. The soft key 45e corresponding to site 47e and the legend SAVE SAMPLE is pressed and the status information is thereby caused to change from REMOVED back to STORED. (And, of course, the user should take care to actually replace the specimen 25 in its position 23a.)

Security features

If desired, the apparatus 10 and method facilitate restricting access to a freezer 11 or multi-freezer facility by requiring use of a personal identification number (PIN) which is linked to a user identifier. To use this feature, information in the form of FIG. 8 is caused to be displayed and the soft key 45b corresponding to the legend CONFIG is pressed. Information will be displayed as in FIG. 16 and the soft key 45d corresponding to site 47d and the legend ENTER PIN # is pressed. This causes information to be displayed as in FIG. 17.

The arrow keys 75 are manipulated to move the entry field 77 to an unused PIN # field (as indicated by " - - - ") and the hard keys 43 and the ENTER key 79 are manipulated to enter a PIN having up to four digits. The right-side arrow key 75 is then manipulated to move the field 77 to the adjacent USER ID field 81 and user-identifying information (e.g., the user's initials) are entered. The "Escape" key 53 is then pressed.

Recapitulation

To recapitulate, the above description involving initial specimen storage explains how a specimen 25 is placed at a primary location, e.g., in a compartment 17 closed by a door 15. A specimen identifier 55, e.g., "AG347" is selected and a symbol displayed representing the primary location, e.g., "2" meaning door #2 in a freezer 11.

Such description also explains how a specimen 25 is placed at a secondary location (e.g., a rack 19 behind a door 15), at a tertiary location (e.g., a box 21 on such rack 19) and perhaps even a sub-tertiary or second-teriary location (e.g., a single position 23a in a box 21) within the primary location. Each location is progressively more specific in that a progressively smaller number of specimens 25 will be stored in each location as such locations are considered in the hierarchical order mentioned above.

In the section involving specimen locating, the foregoing description also explains how to remove a specimen 25 from a compartment 17 and, most importantly, how to keep an accurate record by manipulating the interface device 10a to display the primary location on a screen 39. The most straightforward approach to be used when removing a specimen 25 is to enter the specimen identifier 55 and thereby display a specimen location 23 or its hierarchy of locations. Or the user may "scroll" the screen 39 until the proper specimen identifier 55 is displayed.

Still another way involves entering a specimen identifying parameter 65 selected from a group of parameters 65 which includes the specimen identifier 55, a specimen description, a date, a PIN or the like. The specimen record data base is then searched and individual specimen records are displayed in sequence until the proper specimen identifier 55 and the specimen location information are found.

The new method also permits specimen status tracking and recording. The interface device boa is manipulated to display the status of the specimen 25 and removing the specimen 25 is accompanied by changing the displayed status as, for example from STORED to REMOVED.

Using the security features described above provides added system integrity. One may not place a specimen 25 in a freezer compartment 17 or remove a specimen 25 from such freezer 11 without first entering a personal identification number. And, of course, automatic freezer locks could be incorporated to prevent even "first-level" entry into a freezer 11, room 33 or building 35.

The description also includes an explanation relating to specimen removal. The interface device 10a is manipulated to enter the unique specimen identifier 55 and a hierarchy of specimen locations is thereby displayed, either simultaneously or in sequence. A particular one of the locations 23 making up the hierarchy is unique to the specimen 25. The specimen 25 is thereupon removed from the particular location 23. For security purposes, the manipulating step may be preceded by the step of entering a personal identification number.

Definitions

As used in this specification, a "symbol" is a pictogram (sometimes known as an "icon") or other type of represen-
tation having an alpha (alphabet letter) character, a numeric character or both alpha and numeric characters. A "hierarchy" of, e.g., specimen locations, is a group of two or more locations for laboratory specimens 25. All but the first location in the hierarchy are subdivisions of the first and the lower the "rank" of a location in the hierarchy, the fewer are the available specimen storage positions 23a in such location.

For instance, primary, secondary, tertiary, and sub-tertiary locations within and making up a hierarchy are in rank order from highest to lowest. And each location in the hierarchy (except the primary location) includes a space which is part of the next-higher-ranked location in such hierarchy.

The phrase "scrolling" when used with respect to a viewing screen 39 means sequentially displaying different images on such screen 39. A "personal identification number" or PIN is an identifier unique to a person authorized to use the method and which includes an alpha character, a numeric character or a combination of alpha and numeric characters.

A "specimen" is an ampule or vial containing blood, tissue, cells, body fluid or the like. "Identifier" (as used in connection with specimen identification) means any symbol capable of uniquely identifying a particular specimen.

A "hard key" is a key, the nomenclature of which is not changed or is changed only occasionally. A "soft key" is a key, the nomenclature of which changes or can change as the method or apparatus 10 is used. Hard keys 43 and soft keys 45 may be three-dimensional (as the keys on a touch-tone telephone) or they may be of the two-dimensional "pad" type. The latter is preferred, at least for soft keys 45.

A mnemonic legend is a word, phrase or abbreviated word or phrase that assists (or is intended to assist) human memory. As examples, the mnemonic legend PREV. SAMP. means "previous sample" and the mnemonic legend INVENT means "inventory."

While the principles of the invention have been shown and described in connection with a few preferred embodiments, it is to be understood clearly that such embodiments are by way of example and are not limiting.

What is claimed:

1. A method for inventorying and later retrieving a new laboratory specimen among a group of pre-existing specimens in a rack and wherein:

the group of pre-existing specimens is in a cryogenic freezer having an interface device mounted thereon and a keypad on the interface device;

each specimen in the group is associated with an indentifier unique to that specimen;

each specimen in the group includes a vial which is substantially identical to the vials of the other specimens in the group;

each specimen in the group includes a substance comprising at least one of a plurality of substances consisting of blood, tissue, cells, and body fluid from a human patient;

each specimen in the group is unique with respect to the other specimens comprising the group; and and wherein the method includes:

placing the new specimen within a vacant position at a primary location which includes a cryogenic freezer;

selecting a specimen identifier unique to the new specimen;

manipulating the keypad, thereby displaying a symbol representing the position of the new specimen in the primary location; and removing the new specimen from the freezer, such removing step including again manipulating the keypad to display the primary location.

2. The method of claim 1 wherein the placing step includes placing the new specimen at a secondary location within the primary location.

3. The method of claim 2 wherein the placing step includes placing the new specimen at a tertiary location within the secondary location.

4. The method of claim 3 wherein the placing step includes placing the new specimen at a second-tertiary location within the tertiary location.

5. The method of claim 1 wherein the symbol is a first symbol and the displaying step includes displaying a second symbol representing a secondary location.

6. The method of claim 5 wherein the displaying step includes displaying a third symbol representing a tertiary location.

7. The method of claim 5 further including removing the new specimen from the freezer.

8. The method of claim 7 wherein the second manipulating step includes manipulating the keypad to display the primary location and the secondary location.

9. The method of claim 8 wherein the interface device includes a display screen and the second manipulating step includes scrolling the screen until the specimen identifier unique to the new specimen is displayed.

10. The method of claim 8 wherein the interface device includes a display screen and the second manipulating step includes entering a specimen identifying parameter selected from a group of parameters which includes (a) the specimen identifier unique to the new specimen, (b) a description of the new specimen, and (c) a date.

11. The method of claim 8 wherein the interface device includes a display screen, the first manipulating step includes manipulating the keypad to display the status of the new specimen placed within the vacant position and the removing step includes changing the displayed status.

12. The method of claim 11 wherein the placing step is preceded by the step of entering a personal identification number.

13. The method of claim 5 wherein the placing step is preceded by the step of entering a personal identification number.

14. The method of claim 1 wherein the identifier is a preliminary identifier and the selecting step includes providing a warning that the preliminary identifier is in use.

15. The method of claim 1 wherein the interface device includes a display screen and the second manipulating step includes scrolling the screen until the specimen identifier unique to the new specimen is displayed.

16. The method of claim 1 wherein the interface device includes a display screen and the first manipulating step includes entering a specimen identifying parameter selected from a group of parameters which includes (a) the specimen identifier unique to the new specimen, (b) a description of the new specimen, and (c) a date.

17. The method of claim 1 wherein the interface device includes a display screen, the manipulating step includes manipulating the interface device to display the status of the new specimen and the removing step includes changing the displayed status.

18. The method of claim 1 wherein the placing step is preceded by the step of entering a personal identification number.

* * * * *